(12) United States Patent
Stuart et al.

(10) Patent No.: US 6,847,009 B2
(45) Date of Patent: Jan. 25, 2005

(54) WELDING CONTACT TIP AND DIFFUSER

(75) Inventors: Kyle Stuart, Wichita, KS (US);
Rondell L. Longhofer, Wichita, KS (US)

(73) Assignee: Tweco Products, Inc., Wichita, KS (US)

( * ) Notice: Subject to any disclaimer, the term of this patent is extended or adjusted under 35 U.S.C. 154(b) by 89 days.

(21) Appl. No.: 10/431,810

(22) Filed: May 8, 2003

(65) Prior Publication Data

US 2003/0209530 A1 Nov. 13, 2003

Related U.S. Application Data

(60) Provisional application No. 60/379,425, filed on May 10, 2002.

(51) Int. Cl.$^7$ ................................................. B23K 9/28
(52) U.S. Cl. ............................. 219/137.61; 219/137.42
(58) Field of Search ...................... 219/137.61, 137.42, 219/137.31, 137.44, 137.63

(56) References Cited

U.S. PATENT DOCUMENTS

| | | | |
|---|---|---|---|
| 1,119,276 A | 12/1914 | Griffith et al. | |
| 1,324,654 A | 12/1919 | Ferguson | |
| 2,279,146 A | 4/1942 | Schneller | |
| 2,297,548 A | 9/1942 | Fox et al. | |
| 2,761,049 A | 8/1956 | McElrath et al. | |
| 3,007,033 A | 10/1961 | Newman et al. | |
| 3,178,984 A | 4/1965 | Barothy | |
| 3,514,570 A | 5/1970 | Bernard et al. | |
| 3,576,423 A * | 4/1971 | Bernard et al. | 219/136 |
| 3,596,049 A | 7/1971 | Ogden | |
| 4,017,198 A | 4/1977 | Mason | |
| 4,049,943 A | 9/1977 | Pratt | |
| 4,147,920 A | 4/1979 | Merrick et al. | |
| 4,282,419 A | 8/1981 | Auer | |
| 4,645,901 A | 2/1987 | Scholz et al. | |
| 4,914,271 A | 4/1990 | Delzenne et al. | |
| 4,945,208 A | 7/1990 | Lian | |
| 5,018,900 A | 5/1991 | Darrin | |
| 5,338,917 A | 8/1994 | Stuart et al. | |
| 5,440,100 A | 8/1995 | Stuart et al. | |
| 5,585,013 A | 12/1996 | Truty | |
| 5,664,312 A | 9/1997 | Sasaki et al. | |
| 5,726,420 A | 3/1998 | Lajoie | |
| 5,760,373 A | 6/1998 | Colling | |
| 5,911,894 A | 6/1999 | Colling | |
| 6,075,227 A | 6/2000 | Lajoie | |
| 6,163,008 A | 12/2000 | Roberts et al. | |
| 6,307,179 B1 | 10/2001 | Walters, III | |
| 6,657,162 B1 * | 12/2003 | Jung et al. ............. | 219/137.61 |
| 2002/0113046 A1 | 8/2002 | Altekruse et al. | |
| 2002/0113047 A1 | 8/2002 | Doherty | |
| 2002/0113048 A1 | 8/2002 | Altekruse | |

FOREIGN PATENT DOCUMENTS

EP   0 896 850 A1   2/1999

OTHER PUBLICATIONS

International Search Report, PCT/US03/14498, from the European Patent Office dated Aug. 25, 2003.

* cited by examiner

Primary Examiner—Clifford C. Shaw
(74) Attorney, Agent, or Firm—Harness, Dickey & Pierce, P.L.C.

(57) ABSTRACT

A welding contact tip and diffuser assembly for use in a welding apparatus. The assembly includes an electrically conductive contact tip having a tapered exterior surface, a diffuser having a cavity with a tapered interior surface, and a releasable connection for holding the contact tip in the diffuser. The connection includes at least one detent element in either the diffuser or the contact tip, at least one recess forming a ramp in the other of the diffuser or contact tip, and at least one spring. The spring biases the detent element into the recess and against the ramp to generate an axial force against the ramp. The axial force tends to urge the tapered surfaces of the contact tip and diffuser into contact with one another.

27 Claims, 16 Drawing Sheets

WELDING CONTACT TIP AND DIFFUSER

CROSS REFERENCE TO RELATED APPLICATIONS

This application claims priority from U.S. Provisional Application Ser. No. 60/379,425, filed May 10, 2002, the entire text of which is hereby incorporated herein by reference.

BACKGROUND OF THE INVENTION

This invention relates generally to welding apparatus, and more particularly to contact tips and diffusers for MIG welding guns and the like.

This invention represents an improvement over prior connections between a contact tip and the diffuser of a MIG welding gun or automated welding equipment. A typical connection is a threaded connection of the type shown in U.S. Pat. Nos. 5,760,373 and 6,307,179, both of which are incorporated by reference herein for all purposes. However, this type of connection requires turning of the contact tip and diffuser relative to one another, which is often inconvenient, time-consuming and may result in twisted welding wire.

SUMMARY OF THE INVENTION

Among the several objects of this invention may be noted the provision of an improved contact tip and diffuser which are designed for quick and easy assembly, without using threads and without requiring the use of tools; the provision of such an assembly which provides quick and easy disassembly without requiring removal of the nozzle of the welding apparatus and without the need for substantial turning or twisting of the contact tip; the provision of such an assembly which, in some embodiments, provides a dual locking mechanism for maintaining the contact tip in the diffuser; the provision of such an assembly and components which provide for the efficient transfer of current from the diffuser to the contact tip for reduced heat, operation at lower temperatures, and longer component life; and the provision of such an assembly which allows for the tip to rotate to any position relative to the diffuser to expose clean wear surfaces on the tip to the welding wire during the life of the tip and to allow for automatic tip removal and reinsertion for use in automated and robotic applications.

In general, an assembly of this invention comprises an electrically conductive contact tip comprising a tip body having a longitudinal axis, a back end, a forward end, an axial bore through the tip body for the feed of welding wire through the tip and a tapered surface on an exterior of the tip body. A diffuser for conducting electrical current and transmitting shield gas comprises a diffuser body having a longitudinal axis, a back end adapted for connection to the welding apparatus, a forward end, and a cavity in the diffuser body extending from its forward end toward its back end and having a tapered surface. A connection is provided between the diffuser and the contact tip for releasably holding the contact tip in the cavity of the diffuser with the tapered surfaces in contact for conduction of electric current from the diffuser to the contact tip. The connection comprises at least one detent element in either the diffuser or contact tip, at least one recess in the other of the diffuser or contact tip forming a ramp, and at least one spring for biasing the detent element into the recess and against the ramp. An axial force is generated against the ramp tending to urge the tapered surfaces into contact with one another. The contact tip is releasable from the diffuser by exerting an axial force on the tip sufficient to overcome the force of the spring urging the detent element into the recess.

The present invention is also directed to the individual components of the assembly, that is, a welding contact tip and diffuser.

Other objects and features will be in part apparent and in part pointed out hereinafter.

BRIEF DESCRIPTION OF THE DRAWINGS

Corresponding parts are designated by corresponding reference numbers throughout the drawings.

DESCRIPTION OF PREFERRED EMBODIMENT

Figure 1:
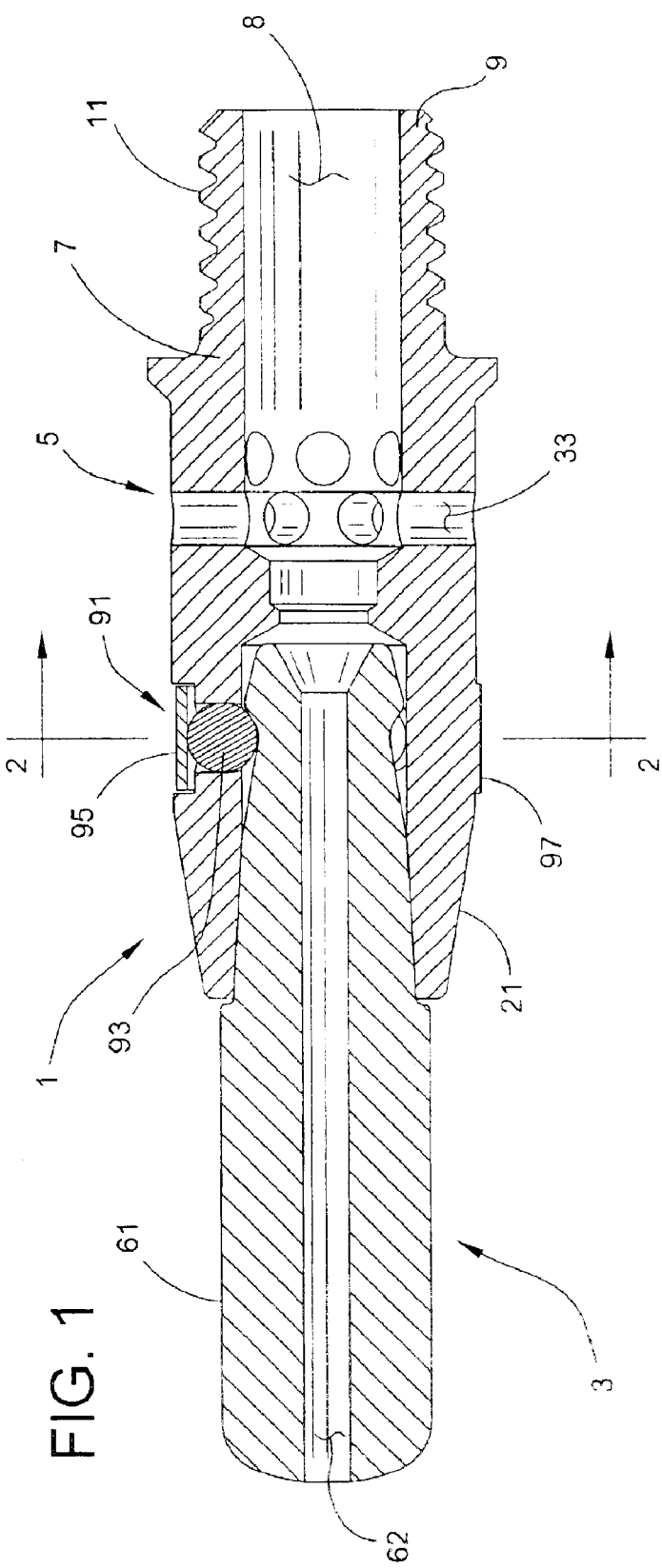
FIG. 1 is a section of a welding contact tip and diffuser assembly of the present invention.

Referring now to the drawings, and first more particularly to FIG. 1, a contact tip and diffuser assembly of the present invention is designated in its entirety by the reference numeral 1, the contact tip being generally designated 3 and the diffuser generally designated 5. This assembly is used in the operation of welding apparatus, typically a MIG welding gun which may be either hand-held or automated. Reference may be made to U.S. Pat. No. 5,338,917, incorporated by reference herein for all purposes, for a disclosure relating to such MIG welding apparatus. It will be understood, however, that the teachings of this invention can be used with other types of cutting, gouging and/or welding equipment.

Figure 4:
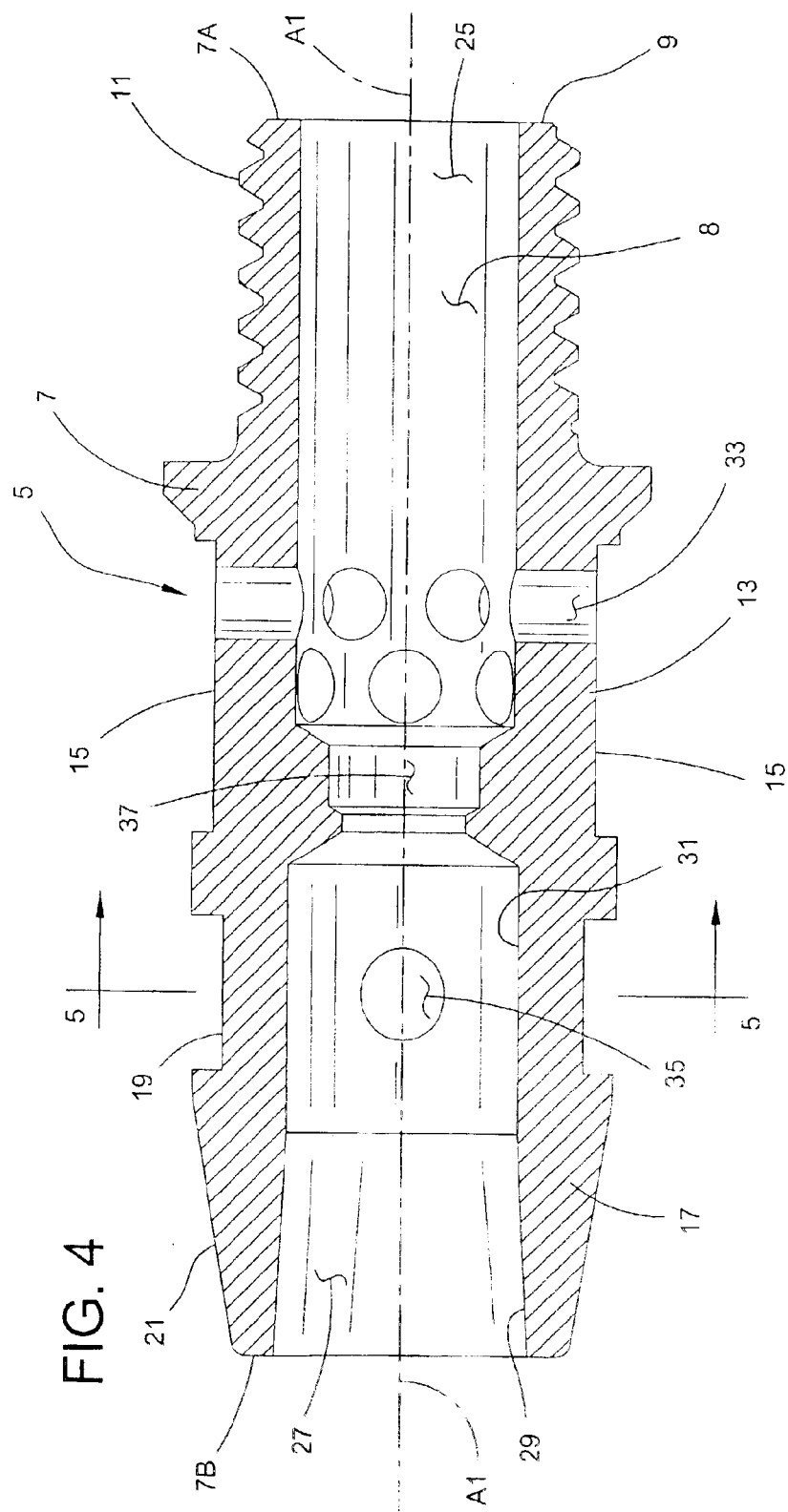
FIG. 4 is a section of a diffuser of the present invention.
Figure 5:
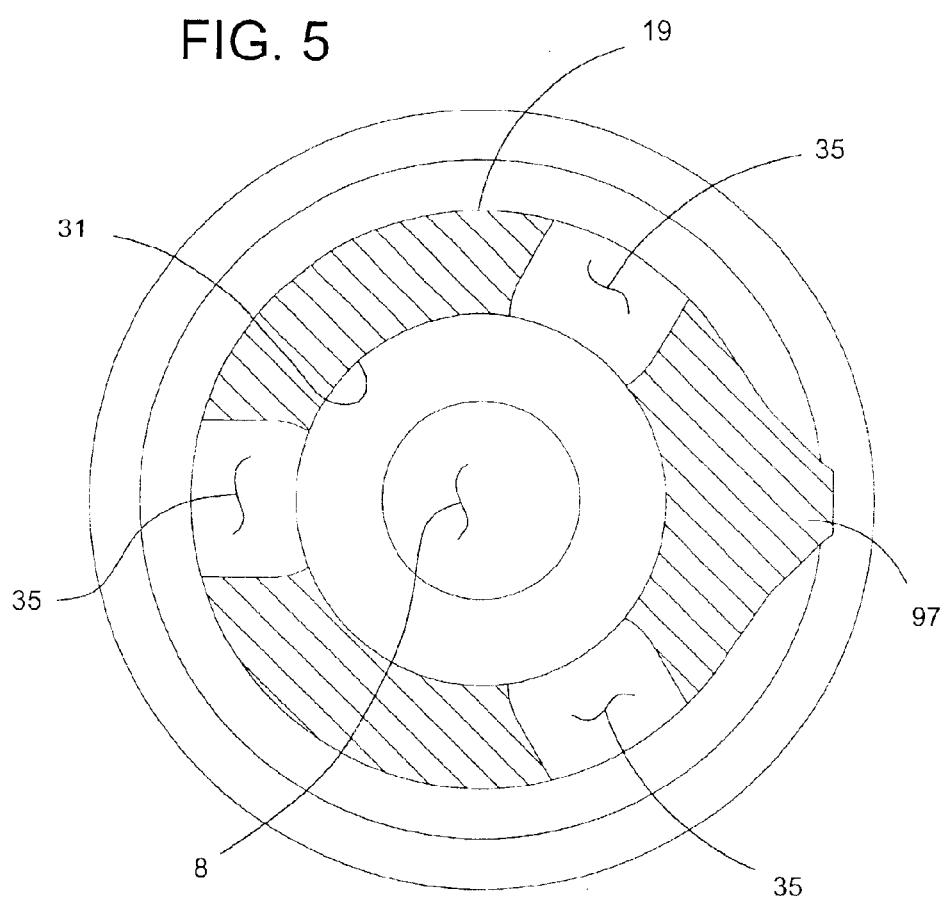
FIG. 5 is a cross-section of the diffuser taken along plane 5—5 of FIG. 4.
Figure 8:
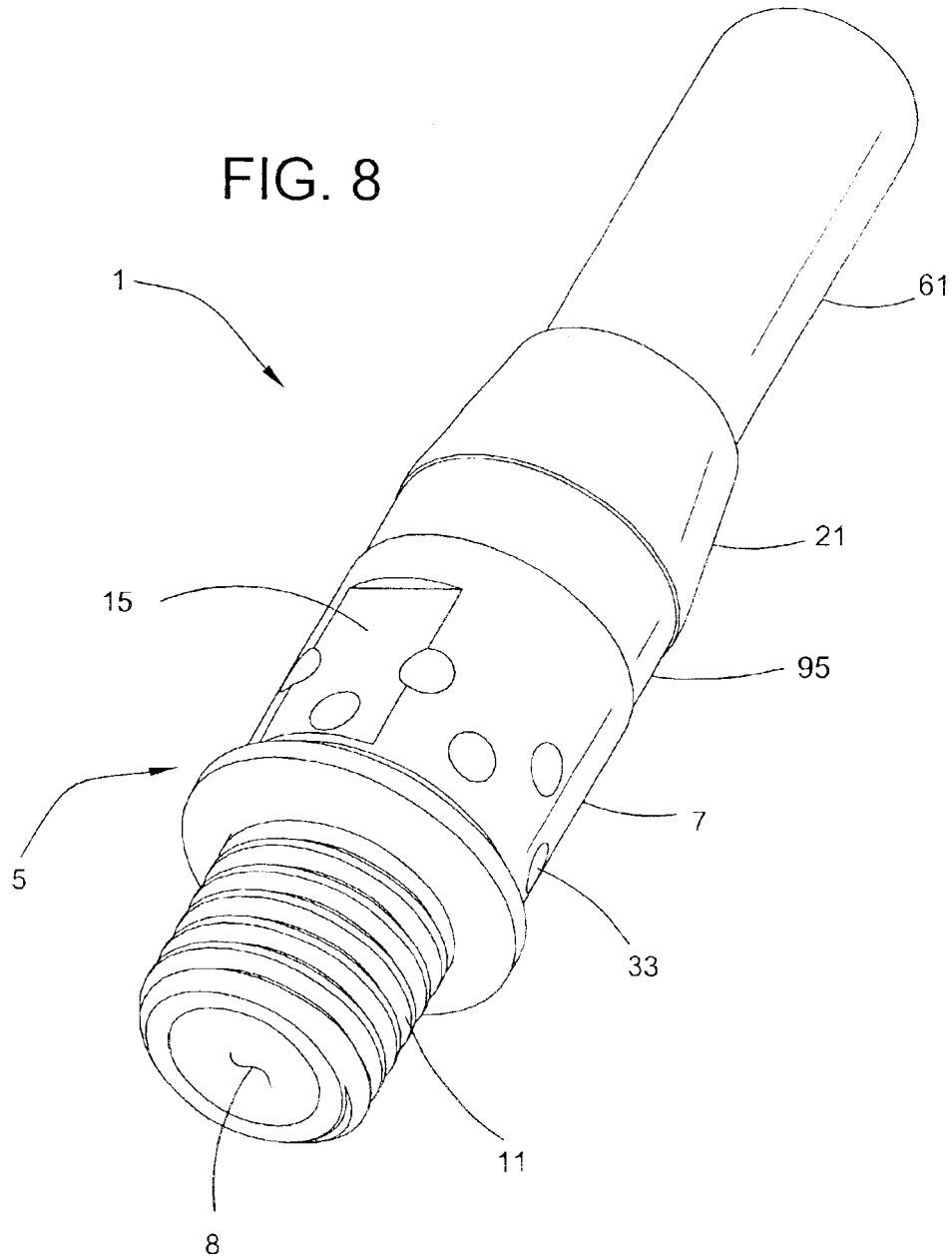
FIG. 8 is a perspective of the welding contact tip and diffuser assembly.

As shown in the drawings and particularly FIGS. 4 and 5, the diffuser 5 of one embodiment of this invention comprises an elongate diffuser body 7 having a longitudinal axis A1, a back end 7A, a forward end 7B, and a central bore 8 extending from the back end to the forward end allowing for the passage of welding wire (not shown) and the flow of shielding gases through the diffuser, as will be understood by those skilled in this field. In one embodiment, the body 7 has a generally cylindric back section 9 formed with external threads 11 for attaching the diffuser 5 to the aforementioned welding apparatus, an intermediate section 13 formed with external wrench flats 15 (FIG. 8) to facilitate installation and removal of the diffuser, and a forward end section 17 formed with an external circumferential groove 19 and a tapered exterior surface 21 extending from a point adjacent the groove to the forward end 7B of the diffuser body. It will be understood that threads 11 may be internal threads alternatively located on the interior surface of cylindrical back section 9 for attaching the diffuser 5 to the aforementioned welding apparatus (not shown).

In one embodiment, the central bore 8 defines a first generally cylindric cavity 25 adjacent the back end 7A of the body 7 and a second cavity 27 adjacent the forward end 7B of the body (FIG. 4), the second cavity having a tapered interior contact surface 29 near the forward end of the body and a cylindric interior surface 31 adjacent the tapered contact surface. A first set of one or more generally radial bores 33 extends from the first cavity 25 to the intermediate section 13 of the exterior surface of the diffuser body 7 and provides for the flow of shielding gas in a radially outward direction from the cavity. A second set of one or more generally radial bores 35 extends from the cylindric interior surface 31 of the second cavity 27 to the groove 19 in the forward end section 17 of the exterior surface of the body 7. The purpose of these bores will be explained later. In the illustrated embodiment three generally radial bores 35 are spaced at regular (e.g., 120 degree) intervals from each other around the second cavity 27, but it will be understood that this number can vary. The central bore 8 has an intermediate section 37 of reduced diameter connecting the two cavities 25 and 27. This intermediate bore section 37 receives the terminal end of a conventional spring wire conduit surrounding the welding wire (not shown). In the embodiment of FIG. 4, a set screw (not shown) is threaded into a MIG welding gun (not shown) to contact the spring wire conduit (not shown) at a point upstream of the diffuser body 7 to secure the wire conduit in the central bore 8. As illustrated in a later described embodiment, the set screw (not shown) for securing the wire conduit (not shown) may be located in a radial bore (not shown) through the intermediate body section 13 leading to the intermediate bore section 37. The diffuser body 7 is made from a suitable electrically conductive material.

Figure 6:
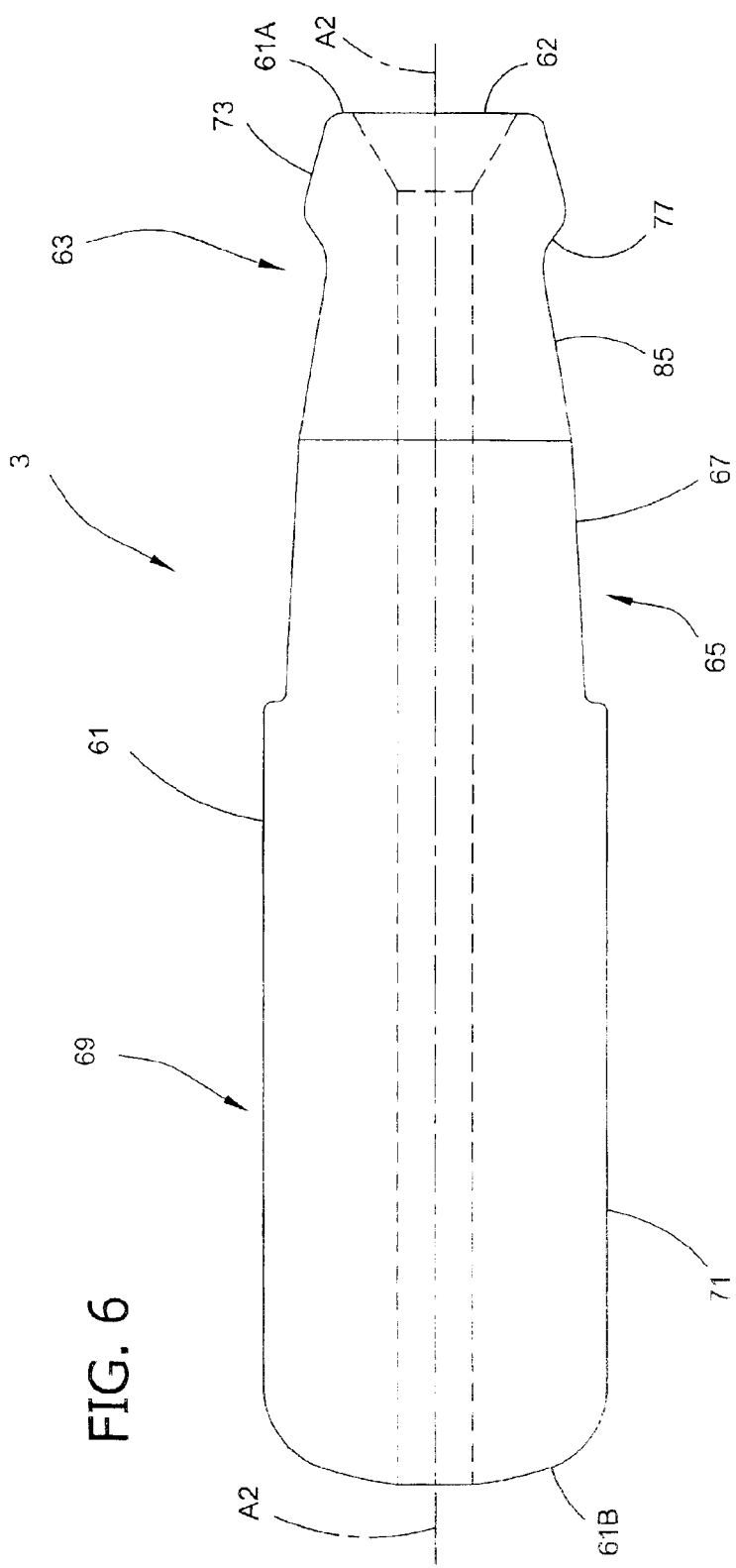
FIG. 6 is a side elevation of a contact tip of the present invention.

Referring to FIG. 6, the contact tip 3 comprises an elongate tip body 61 having a longitudinal axis A2, a back end 61A, a forward end 61B, and an axial bore 62 through the tip body for the feed of welding wire (not shown). Axial bore 62 may be any cross-sectional shape including circular, oval, polygonal, etc. In one embodiment, the body 61 has a back section 63, an intermediate section 65 defined by a tapered exterior contact surface 67, and a forward section 69 defined by a cylindric surface 71 terminating at the forward end 61B of the body which is slightly rounded or domed. Alternatively, the forward end 61B of the contact tip 3 can be tapered or have other shapes.

Figure 7:
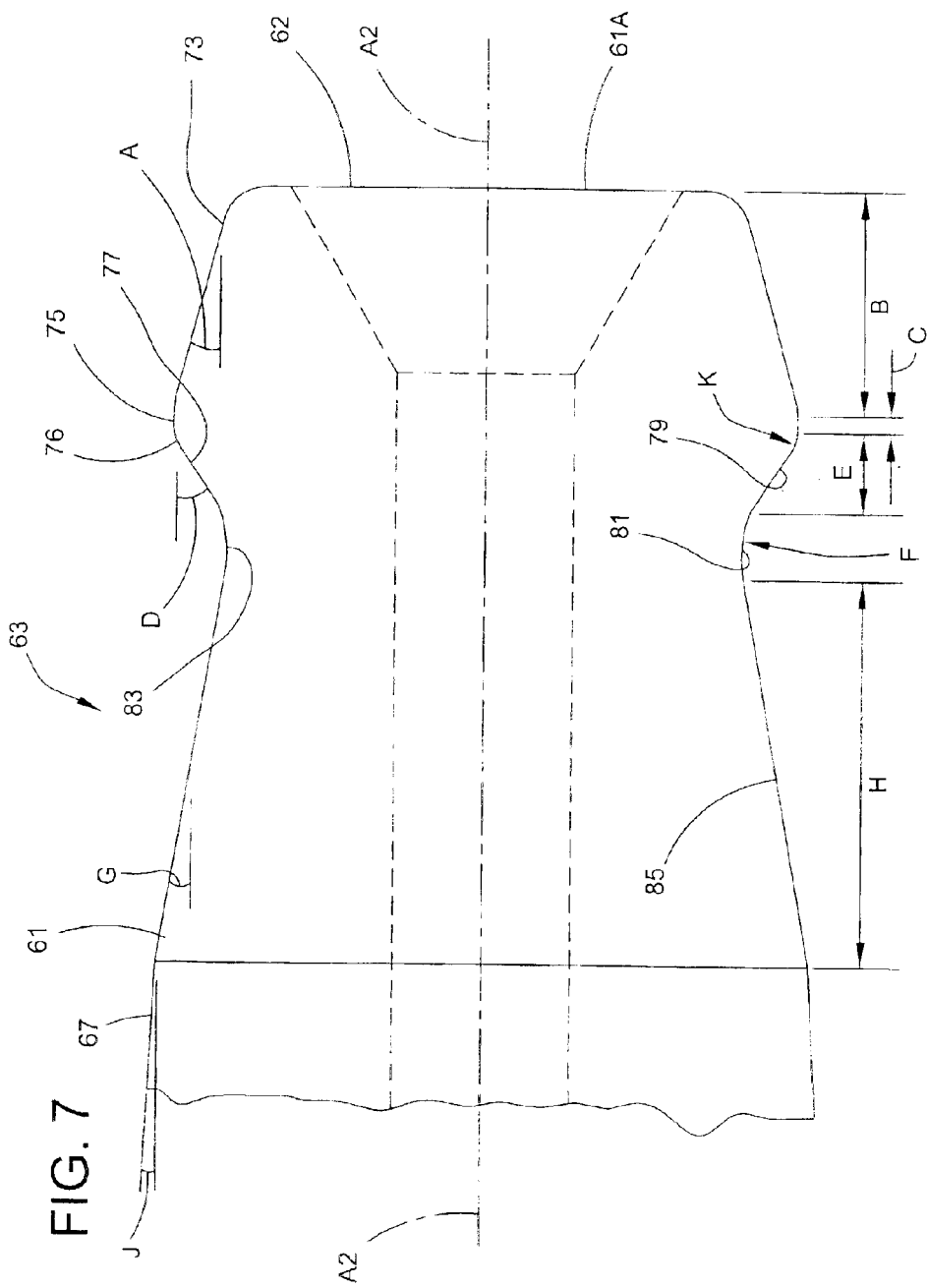
FIG. 7 is an enlarged portion of FIG. 6 showing a back end of the contact tip.

FIG. 7 illustrates the geometry of the back section 63 of the contact tip 3 which is constructed in accordance with the present invention. Progressing forward from the back end 61A of the tip 3, the back section 63 includes: a tapered lead-in surface 73 inclined in the forward direction at angle A relative to the longitudinal axis A2 of the tip and having an overall axial length B; a short generally cylindric surface 75 having an axial length C; a rounded corner 76 having a radius of curvature K, a ramp 77 tangential with rounded corner 76 declining in the forward direction comprising a relatively flat ramp surface 79 inclined at an angle D relative to axis A2 and having an axial length E, and a rounded ramp surface 81 tangential with the relatively flat ramp surface 79 and having a radius of curvature F (FIG. 7). Forward direction angle A is preferably in the range of 5° to 35°, and more preferably about 16°; axial length B is preferably in the range of 0.03 to 0.20 in.; axial length C is preferably in the range of 0.01 to 0.05 in.; radius of curvature K is preferably in the range of 0.005 to 0.050 in.; and radius of curvature F is preferably in the range of 0.025 to 0.125 in. It will be understood that if radius of curvature F of rounded ramp surface 81 in the illustrated embodiment is less than 0.063 in., then ramp surface 79 will be flat (i.e., linear as viewed in FIG. 7). Alternatively, if radius of curvature F in the illustrated embodiment is greater than or equal to 0.063 in., then ramp surface 79 will be slightly S-shaped as a result of the convergence of rounded corner 76 and rounded ramp surface 81. It will be understood that the convergence of rounded corner 76 and ramp surface 81, resulting in S-shaped ramp surface 79, may occur at various other radii of curvature F (for example 0.047 in.) corresponding to other sizes of contact tips 3. Angle D of ramp surface 79 is preferably in the range of 20° to 60°, and more preferably about 40°. The axial length E of ramp surface 79 is preferably in the range of 0.02 to 0.10 in.

Referring again to FIG. 7, the declination of the ramp 77 forms a circumferential recess 83 around the tip body 61. A tapered transition surface 85 inclines forward at an angle G tangential from the rounded surface 81 to the tapered contact surface 67 of the intermediate section 65 of the tip. This transition surface 85 has an axial length H and preferably tapers at an angle G somewhat more severe than the angle of taper J of the contact surface. For example, the tapered contact surface 67 may taper at an angle J preferably in the range of 2° to 4°, more preferably about 3°, while the tapered transition surface 85 may taper at an angle G preferably in the range of 5° to 25°, more preferably about 9°. Axial length H of transition surface 85 is preferably in the range of 0.08 to 0.30 in. The contact tip 3 is also made of a suitable electrically conductive material.

Figure 2:
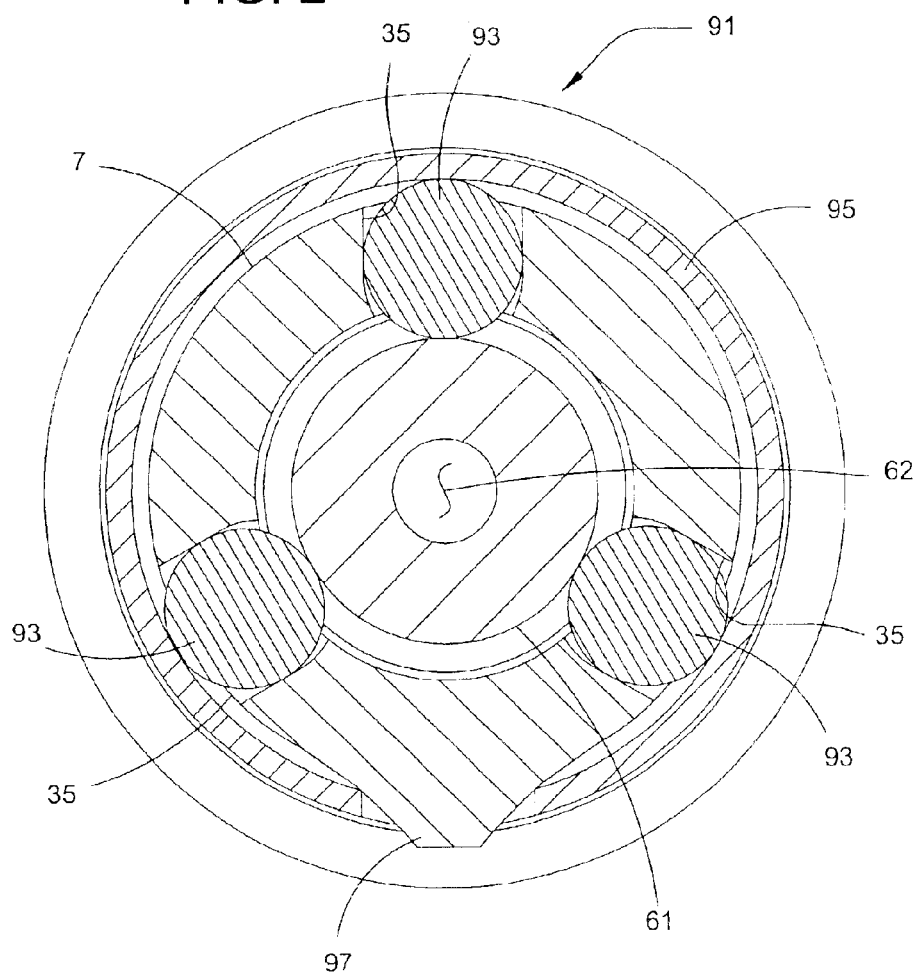
FIG. 2 is a cross-section taken along plane 2—2 of FIG. 1.
Figure 3:
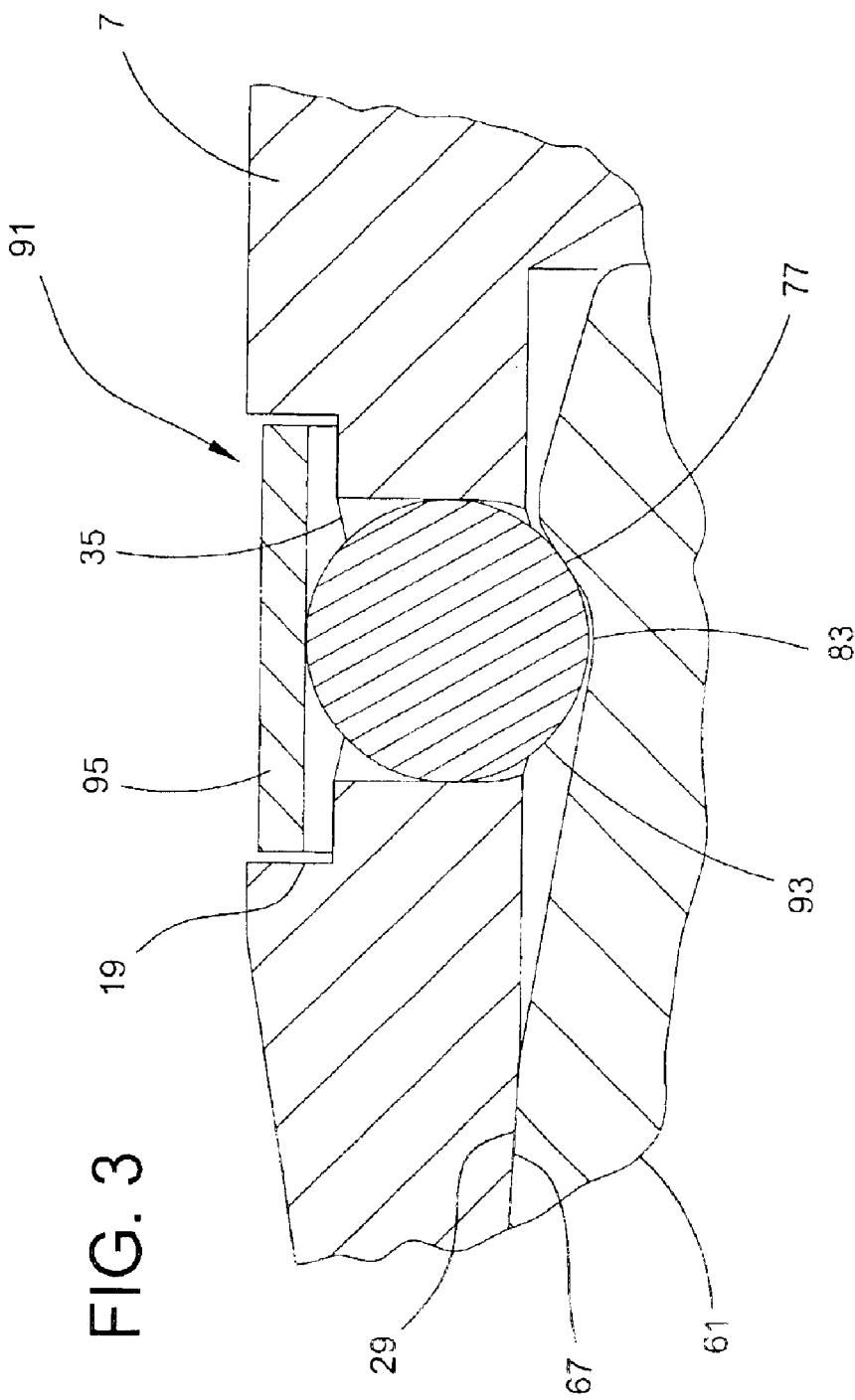
FIG. 3 is a detail of a connection between the welding contact tip and diffuser of FIG. 1.

In accordance with this invention, the assembly of the present invention also includes a connection, generally designated 91 in FIG. 1, for releasably holding the tip 3 in the second cavity 27 of the diffuser 5 with the tapered contact surfaces of the tip and diffuser, 67 and 29 respectively, in contact with one another for the efficient transfer of electric current from the diffuser to the tip. Referring particularly to FIGS. 1–3, the connection 91 comprises a plurality of detent elements 93, e.g., spherical balls, received in the radial bores 35. Each detent element 93 and radial bore 35 is constructed so that the detent element is free to move either radially inward toward the recess 83 in the tip 3 or radially outward. A resilient spring, preferably in the form of split collar 95, is disposed in the external groove 19 in the diffuser body 7 and urges the detent elements 93 toward a locking position in which they are received in the recess 83 and contact the ramp 77 adjacent the bottom of the ramp. As will be further described, the detent elements 93 exert a force on the ramp 77 having an axial component which tends to draw the tip 3 farther into the diffuser 5 to a position in which the tapered contact surfaces 67 and 29 are in intimate contact with one another. Preferably, the tip 3 and diffuser 5 are dimensioned and configured so that the detent elements 93 are spaced at least slightly above the bottom of the ramp 77 when the tapered contact surfaces meet, thereby ensuring that the axial force exerted by the detent elements 93 on the ramp maintains the contact surfaces pressed against one another during use of the welding apparatus. To achieve this result in the preferred embodiment, the components of the connection 91 are configured so that as the contact tip 3 is inserted into the diffuser 5, the detent elements 93 start to move down the ramp 77 when the separation of the tapered contact surfaces diminishes to a distance less than the axial length E of the ramp surface 79 (FIG. 7). Also, in the preferred embodiment, the radius of curvature F of the rounded surface 81 at the bottom of the ramp 77 forming recess 83 is the same as the radius of curvature of the spherical detent element 93 (FIG. 3), but this is not essential.

The diffuser body 7 is formed with a protrusion 97 which projects between the ends of the split collar 95 to prevent relative rotation between the diffuser body 7 and the collar. Because the collar 95 is split, it is able to expand (if forced to do so) to permit the detent elements 93 to move up the ramp 77 to permit separation of the diffuser 5 and contact tip 3, as when the contact tip is pulled with a forward force sufficient to overcome the force exerted by the spring collar.

Figure 9:
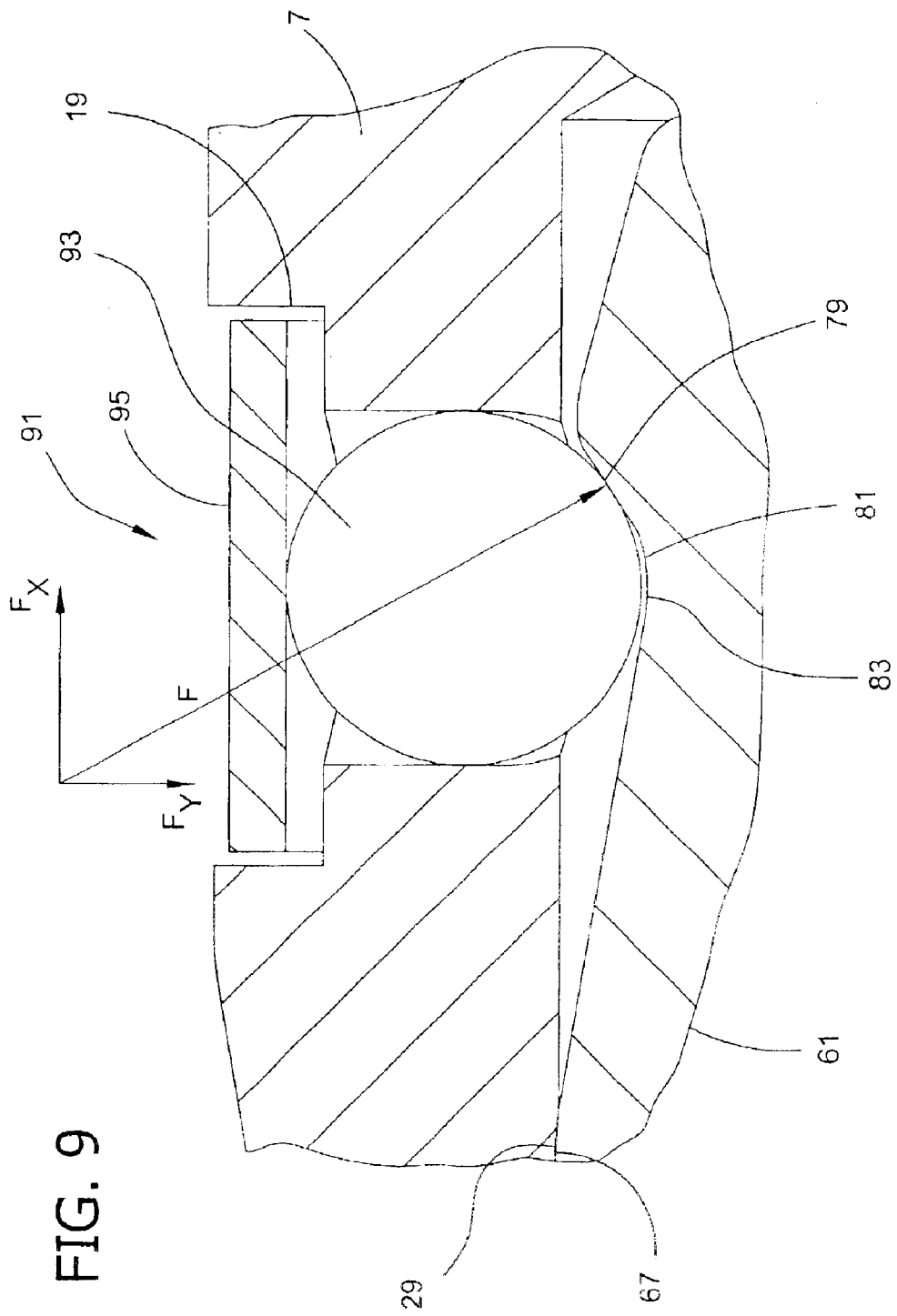
FIG. 9 is a detail of the connection between the contact tip and diffuser showing a force diagram illustrating the forces acting on the contact tip.

FIG. 9 is a detail similar to FIG. 3 showing the contact tip 3 in a final position fully inserted into the diffuser 5 but also showing exemplary forces applied by the detent balls 93. The resultant force F acts on the contact point between the detent ball 93 and the ramp surface 79 and has an axial component $F_X$ and radial component $F_Y$. Axial component $F_X$ urges the contact tip 3 farther into the diffuser body 7, thereby forcing the opposing tapered surfaces 67 and 29 into secure contact. The magnitude of axial force component $F_X$ is directly proportional to the decline angle D of relatively flat ramp surface 79, so that a steeper (closer to vertical) ramp surface creates a greater axial force urging the contact tip 3 into the diffuser 5. The specific configurations and dimensions necessary to achieve the required forces will vary from application to application, and from one size of contact tip 3 to another size contact tip. However, the ratio $F_X/F_Y$ is preferably in the range of 0.2 to 0.8, and more preferably about 0.5. By way of example, the axial force component $F_X$ exerted by the balls 93 may be in the range of 3 to 15 lbs.

It is preferable (albeit not essential) that the tapered contact surfaces 67 and 29, on the contact tip 3 and diffuser 5 respectively, be at angles which provide for self-locking of the surfaces relative to one another, as will be understood by those familiar with this art. Included tapered angles of less than six degrees will generally achieve self-locking. The use of self-locking tapers, along with the detent locking forces exerted by the balls 93, provides a dual-locking system which is very effective for holding the contact tip 3 in proper position in the diffuser 5.

Figure 10:
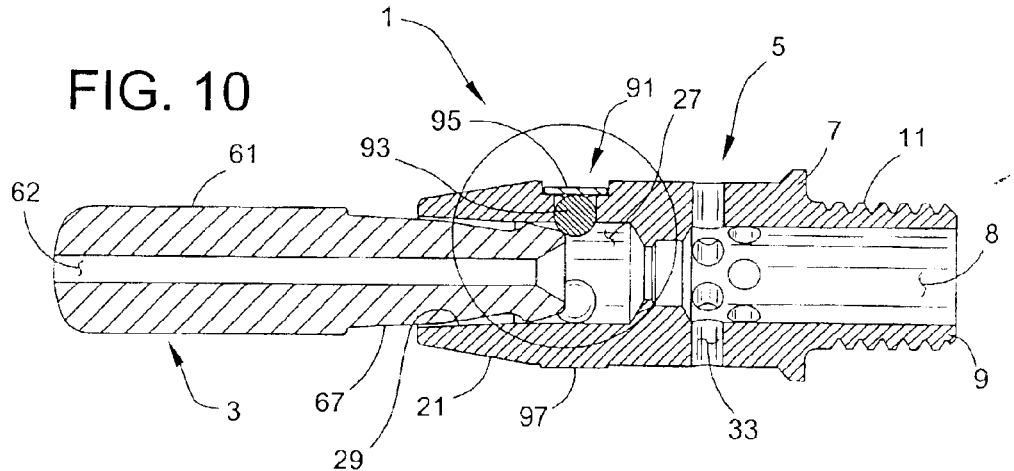
FIGS. 10–13A are views showing progressive stages of insertion of the contact tip into the diffuser.
Figure 10A:
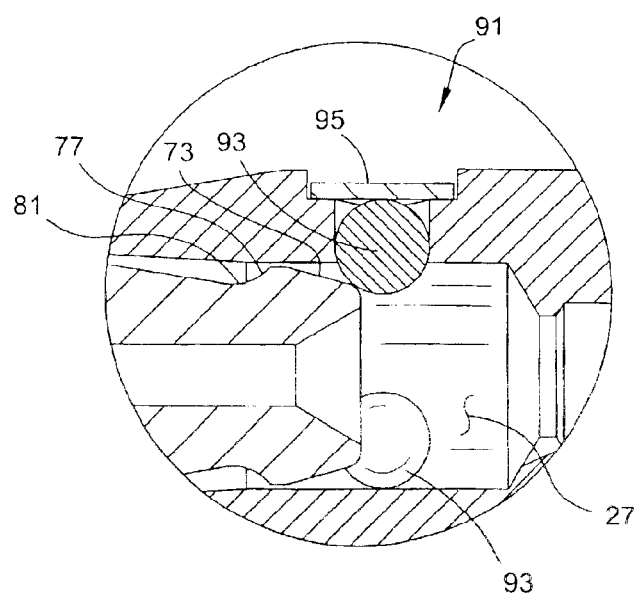
Figure 11:
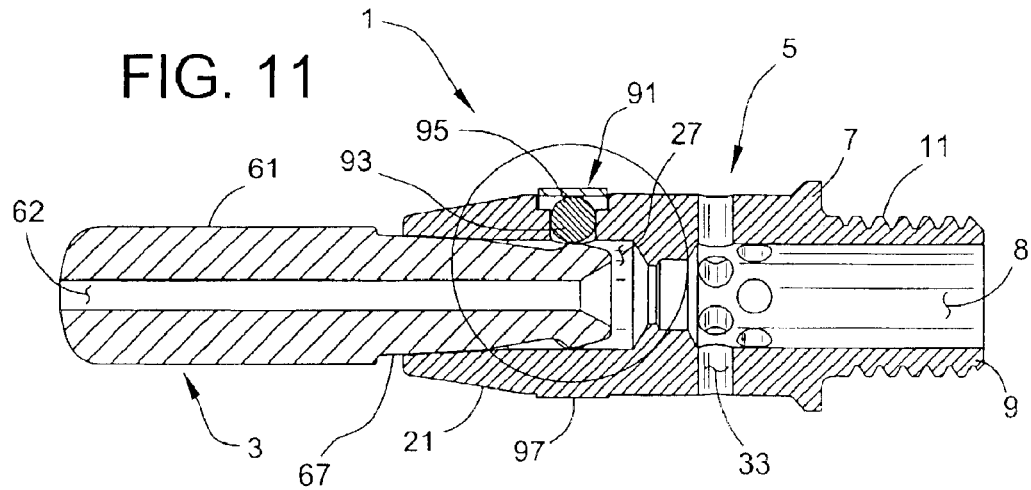
Figure 11A:
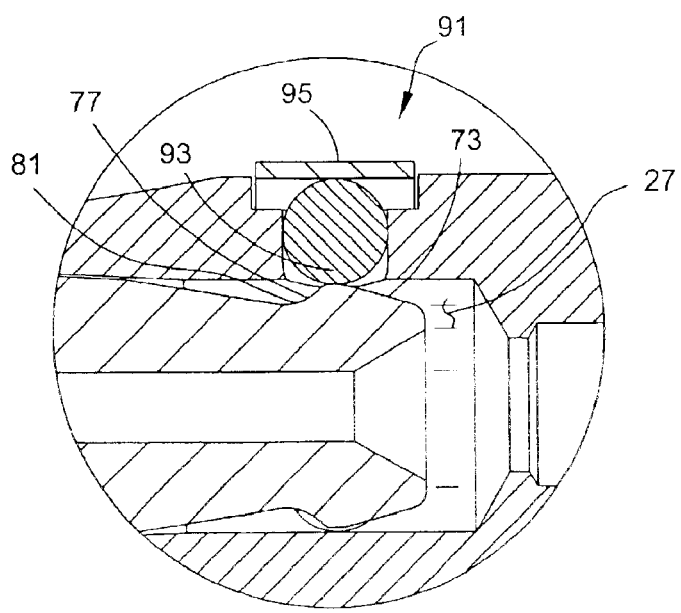
Figure 12:
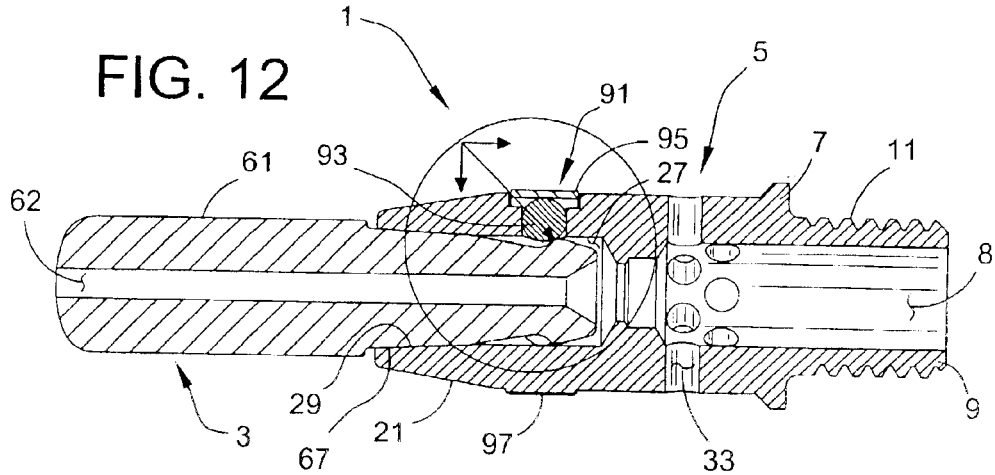
Figure 12A:
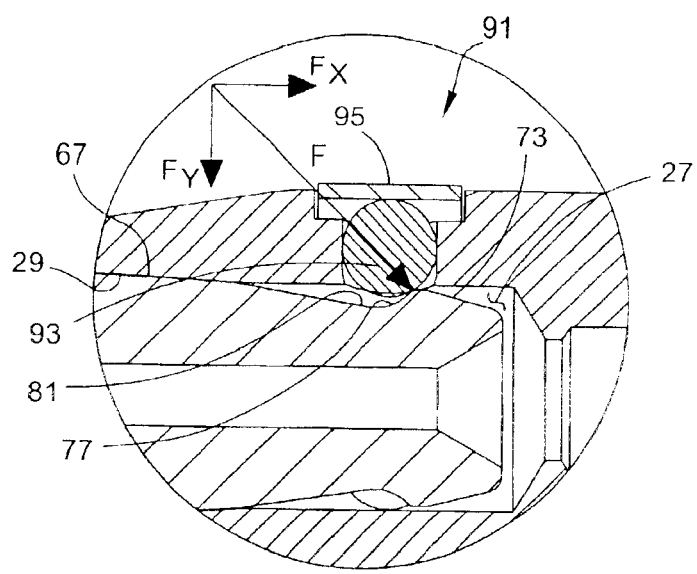
Figure 13:
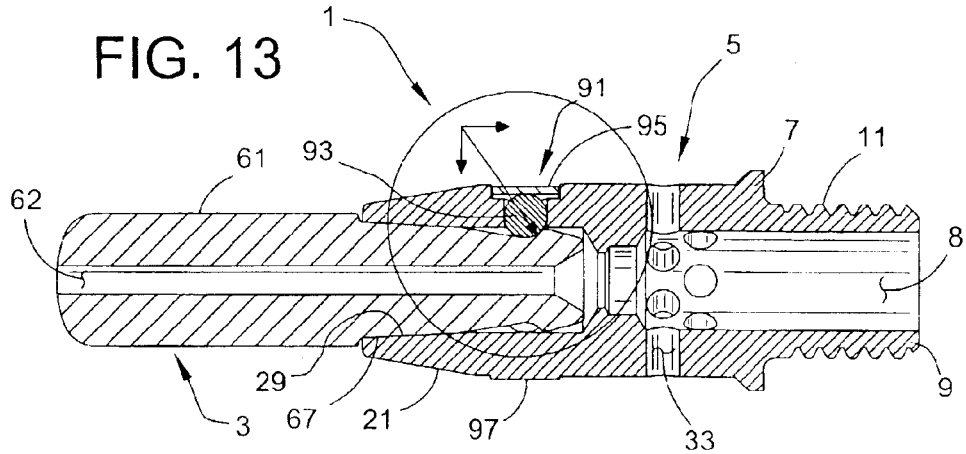
Figure 13A:
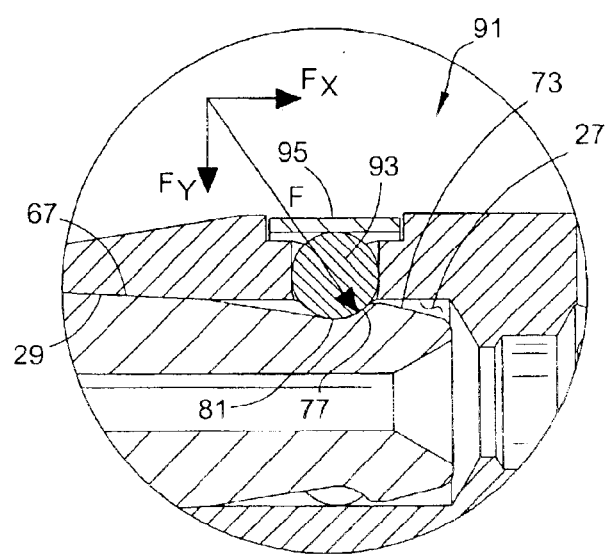

To use the contact tip 3 and diffuser 5 of this invention, the diffuser is mounted on welding apparatus, such as by threading the back end of the diffuser into the body of a MIG welding gun. After the diffuser 5 is installed, the back end of the contact tip 3 is pushed in an axial direction, without turning or twisting, into the cavity 27 of the diffuser until the back end of the tip contacts the balls 93 (FIGS. 10 and 10A, stage 1). Further insertion of the tip 3 into the diffuser 5 cause the balls 93 to ride up on the tapered surface 73 of the tip, forcing the balls radially outward against the bias of the spring collar 95 which expands to permit this movement (FIGS. 11 and 11A, stage 2). When the balls 93 reach the ramp 77, the force exerted by the spring collar 95 forces the balls down the ramp toward a point where the tapered contact surfaces on the tip and the diffuser, 67 and 29 respectively, move into intimate contact with one another (FIGS. 12 and 12A, stage 3). When the two tapered surfaces 67 and 29 are fully seated and preferably in self-locking contact, the detent balls 93 stop further movement down the ramp 77 (FIGS. 13 and 13A, stage 4). As noted above, the balls 93 should stop short of the bottom of rounded ramp surface 81 to ensure that the tapered surfaces 67 and 29 remain tightly pressed against one another. The tapered surfaces 67 and 29 provide a relatively large area of contact between the tip 3 and diffuser 5, resulting in the generation of less heat through lower resistance and a more efficient path for the removal of heat from the contact tip. The benefit of this design is longer tip life through cooler operating temperatures. Another advantage of this design is that the tip and diffuser can be quickly and easily assembled without turning or twisting the components relative to one other, and without the use of tools. It will be understood, however, that the contact surfaces between the tip and diffuser need not be tapered. For example, the contact surfaces could lie in parallel planes transverse to respective axes A1 and A2.

When the tip 3 is to be replaced, it is rotated slightly to release the taper lock and then simply pulled straight out of the cavity 27 using an axial force sufficient to overcome the force exerted on the detent balls 93 by the spring collar 95. (If the taper lock feature is omitted, the tip need not be rotated.) This pulling force causes the detent elements 93 (e.g., balls) to move up the ramp 77, which forces the spring collar 95 to expand until the contact tip 3 is free to move out of the diffuser 5.

A useful feature of the present invention is that the connection between the tip 3 and diffuser 5 allows the tip to rotate relative to the diffuser. As a result, the tip 3 can be rotated between welding operations to present clean surfaces to the welding wire as the wire is fed through the tip, enhancing the quality of the weld and increasing tip life. This feature also facilitates insertion and reinsertion of the tip 3 for use in an automated (robotic) welding process.

While the detent elements 93 described above are in the form of balls, it will be understood that the elements could take other forms (e.g., roller pins) without departing from the scope of this invention. Further, the number of detent elements 93 can vary from as few as one to any practical number effective to perform their function. Still further, the type of recess 83 used to receive the detent element(s) may vary. For example, instead of a single circumferential recess 83, one or more discrete recesses (e.g., dimples) with discrete ramps could be used, so long as the ramp configuration described above is present. A separate spring could also be used for each detent element. Also, each detent element 93 could be carried by the contact tip 3, and the recess 83 for receiving the detent could be located in the diffuser 5. While the ramp 77 described above is in the form of a forward declining relatively flat ramp surface 79 with a tangential rounded surface 81, it will be understood that the ramp could take other forms (e.g. concave or convex) without departing from the scope of this invention, so long as it is contoured for contact by the spring-biased detent element 93 to exert a force tending to draw the tapered contact surfaces 67 and 29 toward one another.

Figure 14:
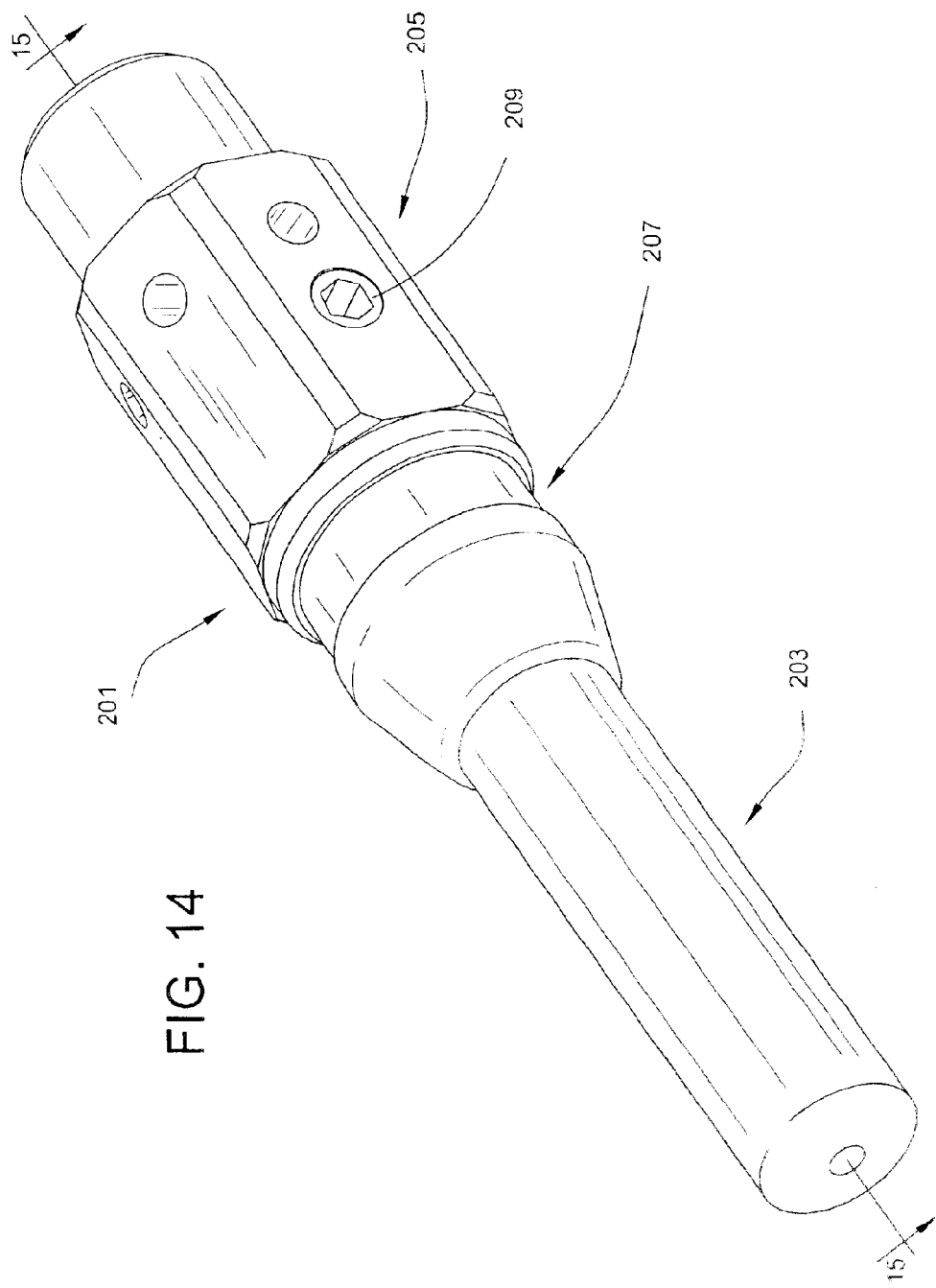
FIG. 14 is a perspective of a second embodiment of a welding contact tip and diffuser assembly of the present invention.
Figure 15:
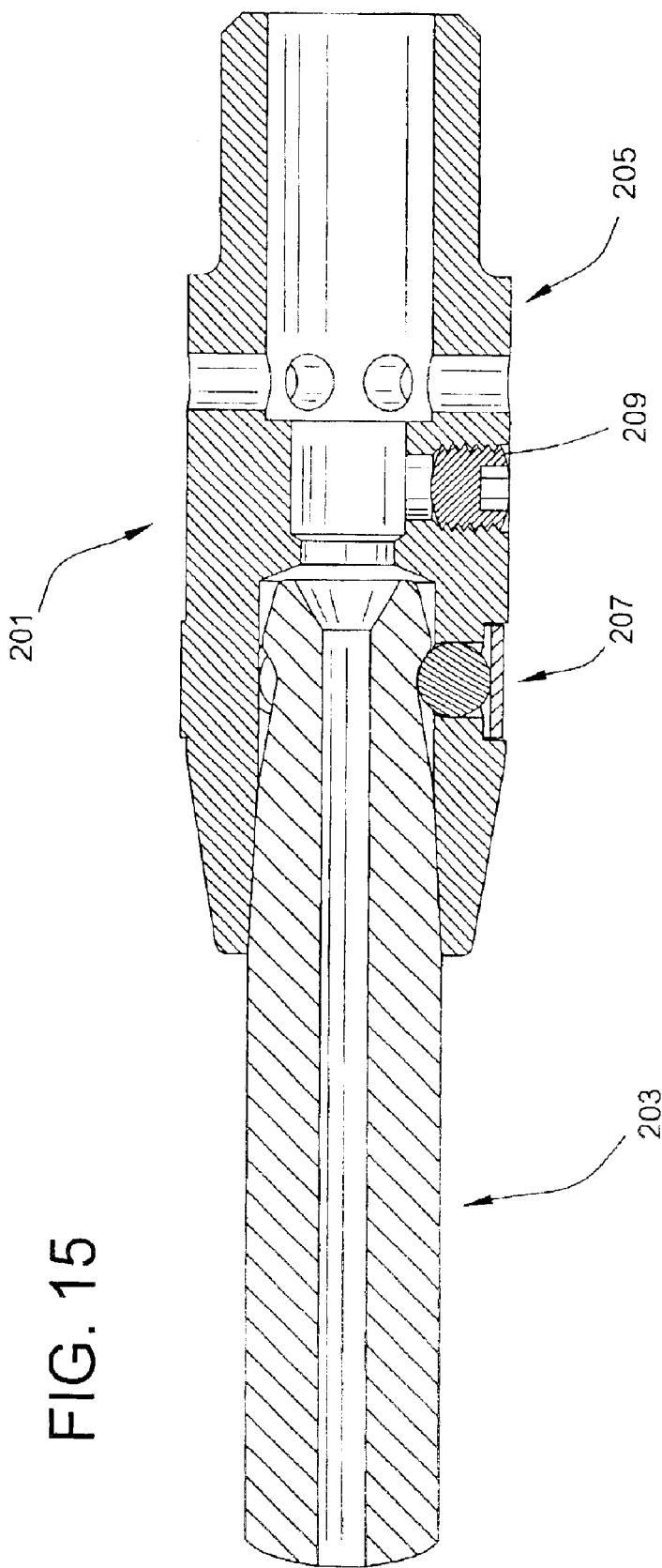
FIG. 15 is a cross-section of the assembly taken along plane 15—15 of FIG. 14.
Figure 16:
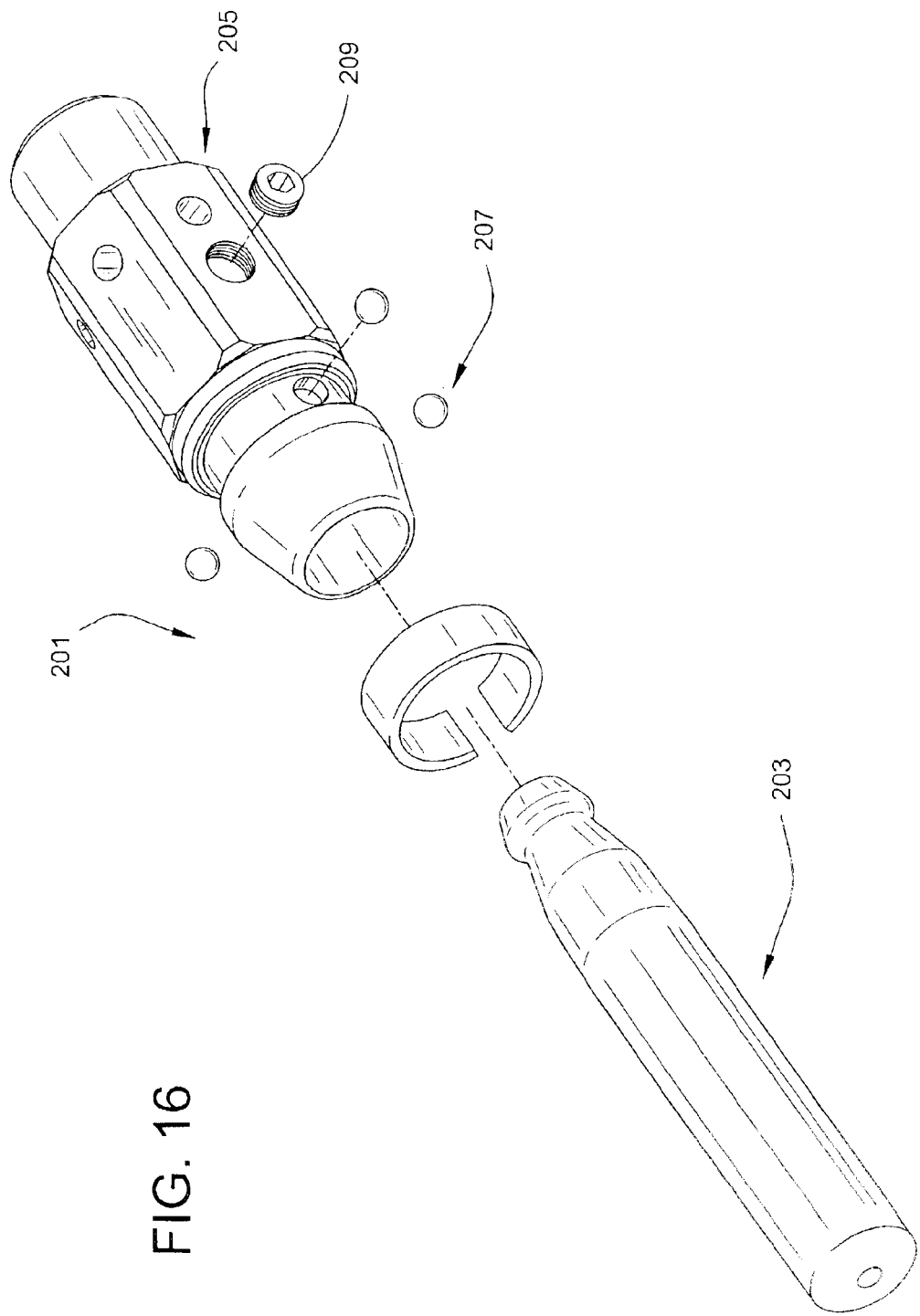
FIG. 16 is an exploded perspective of the second embodiment.

FIGS. 14–16 illustrate a second embodiment of a contact tip and diffuser assembly of the present invention, generally designated 201. This embodiment is substantially similar to the first embodiment. The contact tip of this assembly is generally designated 203 and the diffuser is generally designated 205. The connection between the tip 203 and diffuser 205 is generally designated 207. In this embodiment, a set screw 209 for holding conventional spring wire conduit (not shown) is used to secure the wire conduit in a fixed position relative to the diffuser 205.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A welding contact tip and diffuser assembly for use in a welding apparatus, said assembly comprising:
   an electrically conductive contact tip comprising a tip body having a longitudinal axis, a back end, a forward end, an axial bore through the tip body for the feed of welding wire through the tip, and a tapered surface on an exterior of the tip body,
   a diffuser for conducting electrical current and transmitting a shield gas, said diffuser comprising a diffuser body having a longitudinal axis, a back end adapted for connection to said welding apparatus, a forward end, and a cavity in the diffuser body extending from its forward end toward its back end, said cavity having a tapered surface, and
   a connection between the diffuser and the contact tip for releasably holding the contact tip in the cavity of the diffuser with said tapered surfaces in contact for the conduction of electric current from the diffuser to the contact tip, said connection comprising at least one detent element in one of said diffuser and contact tip, at least one recess in the other of said diffuser and contact tip forming a ramp, and at least one spring for biasing said detent element into said recess and against the ramp to generate an axial force against the ramp tending to urge said tapered surfaces into contact with one another, said contact tip being releasable from the diffuser by exerting an axial force on the tip sufficient to overcome the force of said spring urging the detent element into said recess.

2. An assembly as set forth in claim 1 wherein said at least one detent element is carried by the diffuser and said recess is in said contact tip.

3. An assembly as set forth in claim 2 wherein said at least one detent element comprises a plurality of detent balls and said recess comprises a circumferential recess in an outer surface of the contact tip for receiving the balls.

4. An assembly as set forth in claim 2 wherein said at least one detent element is received in a generally radial bore in the body of the diffuser, and wherein said at least one spring comprises a resilient collar around the body of the diffuser and in contact with said at least one detent element for urging the element in a radial inward direction.

5. An assembly as set forth in claim 4 wherein said body of the diffuser further comprises a circumferential groove for receiving said resilient collar.

6. An assembly as set forth in claim 4 wherein said body of the diffuser further comprises a protrusion in contact with said resilient collar at a first end and a second end of said collar for limiting movement of said collar relative to said diffuser body.

7. An assembly as set forth in claim 1 wherein said ramp declines in a forward direction.

8. An assembly as set forth in claim 7 wherein said ramp comprises a flat surface declined in a forward direction at an angle in the range of approximately 20 to 60 degrees.

9. An assembly as set forth in claim 8 wherein said ramp further comprises a rounded surface adjacent to the bottom of the recess having a radius of curvature approximately equal to that of the detent ball.

10. An assembly as set forth in claim 1 wherein said tapered surfaces are located between said back end and said forward end of the diffuser body.

11. An assembly as set forth in claim 1 wherein the tapered surfaces are angled to generate a self-locking force.

12. An assembly as set forth in claim 1 wherein said tip and diffuser can be assembled without twisting the tip and diffuser relative to one another about either longitudinal axis.

13. A welding contact tip for use in a welding apparatus, said contact tip comprising an elongate body having a longitudinal axis, back and forward ends, an axial bore through the body for the feed of a continuous welding wire through the body, a tapered exterior surface on the body adapted for contact with a tapered interior surface on a diffuser when the contact tip is inserted into the diffuser, and a recess in an exterior surface of the body forming a ramp on the body adapted for engagement by at least one spring-biased detent element carried by said diffuser, said ramp being so configured that contact by said spring-biased detent element creates a force in an axial direction tending to urge said tapered surfaces toward one another.

14. A welding contact tip as set forth in claim 13 wherein said recess is located generally adjacent the back end of the tip between said tapered exterior surface and the back end of the tip.

15. A welding contact tip as set forth in claim 14 wherein said recess comprises a circumferential recess in the tip.

16. A welding contact tip as set forth in claim 13 wherein said ramp comprises a flat surface declined in a forward direction at an angle in the range of approximately 20 to 60 degrees.

17. A welding contact tip as set forth in claim 16 wherein said ramp further comprises a rounded surface adjacent to the bottom of the recess having a radius of curvature approximately equal to that of the detent element.

18. A welding diffuser for conducting electrical current and transmitting a shield gas in a welding operation, said diffuser comprising
   a body having a longitudinal axis, a back end adapted for connection to said welding apparatus and a forward end,
   a cavity in the diffuser body extending from its forward end toward its back end, said cavity having an interior tapered surface adapted for contact by an exterior tapered surface of a contact tip inserted in said cavity,
   at least one generally radial bore in the body having a radial inner end communicating with said cavity and a radial outer end,
   a detent element movable in said radial bore, and
   a resilient collar around the body of the diffuser for urging the detent element radially inward in said bore toward a position in which the detent element is received in a recess in said contact tip thereby to releasably lock the contact tip in said diffuser.

19. A welding diffuser as set forth in claim 18 wherein said interior tapered surface extends from the forward end of the diffuser toward the back end of the diffuser.

20. A welding diffuser as set forth in claim 19 wherein said tapered surfaces are self-locking.

21. A welding diffuser as set forth in claim 18 wherein said body further comprises a circumferential groove for receiving said resilient collar.

22. A welding diffuser as set forth in claim 18 wherein said body further comprises a protrusion contacting said resilient collar at a first end and a second end of said collar for limiting the movement of said resilient collar relative to said body.

23. A welding contact tip and diffuser assembly for use in a welding apparatus, said assembly comprising:
   an electrically conductive contact tip comprising a tip body having a longitudinal axis, a back end, a forward end, an axial bore through the tip body for the feed of welding wire through the tip, and a diffuser-contacting contact surface on an exterior of the tip body,
   a diffuser for conducting electrical current and transmitting a shield gas, said diffuser comprising a diffuser body having a longitudinal axis, a back end adapted for connection to said welding apparatus, a forward end, and a cavity in the diffuser body extending from its forward end toward its back end, said cavity having a tip-contacting contact surface, and
   a connection between the diffuser and the contact tip for releasably holding the contact tip in the cavity of the diffuser with said contact surfaces in contact for the conduction of electric current from the diffuser to the contact tip, said connection comprising at least one detent element in one of said diffuser and contact tip, at least one recess in the other of said diffuser and contact tip forming a ramp, and at least one spring for biasing said detent element into said recess and against the ramp to generate an axial force against the ramp tending to urge said contact surfaces into contact with one another, said contact tip being releasable from the diffuser by exerting an axial force on the tip sufficient to overcome the force of said spring urging the detent element into said recess.

24. An assembly as set forth in claim 23 wherein said at least one detent element is carried by the diffuser and said recess is in said contact tip.

25. An assembly as set forth in claim 24 wherein said at least one detent element comprises a plurality of detent balls and said recess comprises a circumferential recess in an outer surface of the contact tip for receiving the balls.

26. An assembly as set forth in claim 24 wherein said at least one detent element is received in a generally radial bore in the body of the diffuser, and wherein said at least one spring comprises a resilient collar around the body of the diffuser and in contact with said at least one detent element for urging the element in a radial inward direction.

27. An assembly as set forth in claim 26 wherein said body of the diffuser further comprises a circumferential groove for receiving said resilient collar.

\* \* \* \* \*